United States Patent
Vermeersch et al.

(10) Patent No.: US 8,029,409 B2
(45) Date of Patent: Oct. 4, 2011

(54) METHOD OF PREVENTING UNAUTHORIZED MOVEMENT OF A TRANSMISSION SHIFT MECHANISM

(75) Inventors: Michael C. Vermeersch, Saginaw, MI (US); Larry W. Burr, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 920 days.

(21) Appl. No.: 11/893,993

(22) Filed: Aug. 17, 2007

(65) Prior Publication Data
US 2008/0045381 A1 Feb. 21, 2008

Related U.S. Application Data

(60) Provisional application No. 60/822,876, filed on Aug. 18, 2006, provisional application No. 60/823,187, filed on Aug. 22, 2006.

(51) Int. Cl.
*B60W 10/04* (2006.01)
*B60K 20/00* (2006.01)
*G05D 1/00* (2006.01)

(52) U.S. Cl. .............. 477/96; 74/473.21; 701/2

(58) Field of Classification Search .............. 477/96, 477/97, 99, 125; 74/473.12, 473.13, 473.21, 74/473.22, 473.23; 180/271; 701/2; 70/248, 70/254

See application file for complete search history.

(56) References Cited

U.S. PATENT DOCUMENTS

| | | | |
|---|---|---|---|
| 4,469,192 A | 9/1984 | Schimek | |
| 5,167,308 A * | 12/1992 | Osborn | 477/96 |
| 5,667,286 A | 9/1997 | Hoying et al. | |
| 5,902,209 A * | 5/1999 | Moody | 477/99 |
| 5,975,648 A | 11/1999 | Rump | |
| 6,817,966 B2 * | 11/2004 | Avers et al. | 477/96 |
| 6,832,151 B2 * | 12/2004 | Kumazaki et al. | 701/112 |
| 6,881,175 B2 | 4/2005 | Loibl | |
| 7,326,148 B2 * | 2/2008 | Howe et al. | 477/96 |
| 2003/0195082 A1 * | 10/2003 | Kalia | 477/96 |
| 2005/0037890 A1 * | 2/2005 | Weber et al. | 477/96 |
| 2006/0250214 A1 * | 11/2006 | Mafune et al. | 340/5.62 |
| 2007/0138869 A1 * | 6/2007 | Otani et al. | 307/9.1 |

* cited by examiner

*Primary Examiner* — Roger Pang
(74) *Attorney, Agent, or Firm* — Cantor Colburn LLP

(57) ABSTRACT

A method of preventing unauthorized movement of a transmission shift mechanism comprises the steps of: detecting a predefined event; moving a locking device into an engaged position with a shift mechanism upon the occurrence of the predefined event to retain the shift mechanism in at least one of a park, reverse, neutral, and drive position; and maintaining an ignition system in a substantially off position during the detecting of the event and the moving of the locking device into the engaged position. A vehicle assembly is also provided comprising the transmission shift mechanism and the locking device coupled to the shift mechanism. The vehicle assembly also includes the ignition system, which is movable between off, accessory, run, and start positions, and a controller with the controller energizing the locking device in response to the predefined event to move the locking device into the locked position while the ignition system remains substantially in the off position.

10 Claims, 4 Drawing Sheets

METHOD OF PREVENTING UNAUTHORIZED MOVEMENT OF A TRANSMISSION SHIFT MECHANISM

CROSS-REFERENCE TO RELATED APPLICATIONS

The subject patent application claims priority to and all the benefits of U.S. Provisional Patent Application Ser. Nos. 60/822,876, which was filed on Aug. 18, 2006, and 60/823,187, which was filed on Aug. 22, 2006.

BACKGROUND OF THE INVENTION

1. Field of the Invention

The present invention generally relates to a safety feature that has a locking device or system to prevent unauthorized movement of a shift mechanism in a vehicle, such as an automobile.

2. Description of Related Art

Regulatory requirements mandate various vehicle safety features for the prevention of inadvertent and/or unintended vehicle movement and/or acceleration, regardless of whether a vehicle key is in or out of an ignition and regardless of a key position in the ignition. These safety features are intended to prevent movement of a transmission shift mechanism in order to prevent accidents resulting from vehicles accidentally or unintentionally rolling away or accelerating. Two types of current safety features are known as park-lock systems, which are intended for situations where the key is not in the ignition, and brake transmission shift interlocks (BTSI) systems, which are intended for situations where the key is in the ignition.

Park-lock systems engage the shift mechanism and prevent movement of the shift mechanism until a key is placed within a key cylinder in a traditional system, or a wireless transmitter activates a wireless receiver in a keyless ignition system. When utilized in an automatic transmission, the park-lock system locks the shift mechanism in a park position. Although these park-lock systems are effective, they do not address the safety feature of unauthorized movement of the shift mechanism through an entire range of potential situations.

BTSI systems interconnect the shift mechanism to a brake pedal of the vehicle such that a driver cannot move the shift mechanism until the brake pedal is depressed. Typically in an automatic transmission, the driver cannot move the shift mechanism from the park position until the brake is depressed. These BTSI systems are effective to prevent unwanted vehicle acceleration, but are not designed to be functional throughout an entire range of all positions of the ignition system. In other words, BTSI systems are primarily activated/engaged only when a vehicle engine is running. Other positions of the ignition system include stop, one or more accessory, and start positions. Some BTSI systems have been converted to be activated/engaged during an accessory position but become de-activated during transitions between the other states of the ignition system.

One contemplated solution is to reverse the BTSI system such that the BTSI system is continuously engaged and is then deactivated when the driver depresses the brake pedal. However, to accomplish this solution would require a completely new design and also presents a potential safety hazard. In particular, if the vehicle was to loose power during operation, the BTSI system would re-engage and lock the shift mechanism thereby creating an undesirable situation. To overcome this safety issue, the reversed BTSI design would require a mechanical override, which provides an added cost. The override would also be required to move the vehicle during the assembly process prior to battery power connection.

Accordingly, it is desirable to develop a safety system that prevents unauthorized movement of the shift mechanism in all potential safety situations while avoiding the limitations of the prior art.

SUMMARY OF THE INVENTION

The invention provides a method of preventing unauthorized movement of a transmission shift mechanism of a vehicle. The method comprises the steps of: detecting a predefined event; moving a locking device into an engaged position with the shift mechanism upon the occurrence of the predefined event to retain the shift mechanism in at least one of a park, reverse, neutral, and drive position; and maintaining an ignition system in a substantially off position during the detecting of the event and the moving of the locking device into the engaged position.

The invention also provides a vehicle assembly comprising the transmission shift mechanism for moving the transmission between the at least one of a park, reverse, neutral, and drive positions. The locking device is coupled to the shift mechanism and is movable between an engaged position retaining the shift mechanism in at one of the park, reverse, neutral, and drive positions, and a disengaged position permitting movement of the shift mechanism from one of the park, reverse, neutral and drive positions. The ignition system is movable between off, accessory, run, and start positions for starting and stopping an engine of the vehicle. A controller is connected to the locking device and the ignition system with the controller energizing the locking device in response to the predefined event to move the locking device into the locked position while the ignition system remains substantially in the off position.

Accordingly, the invention sets forth a safety system that prevents unauthorized movement of the shift mechanism in all potential situations without the need to replace existing BTSI systems.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 2:
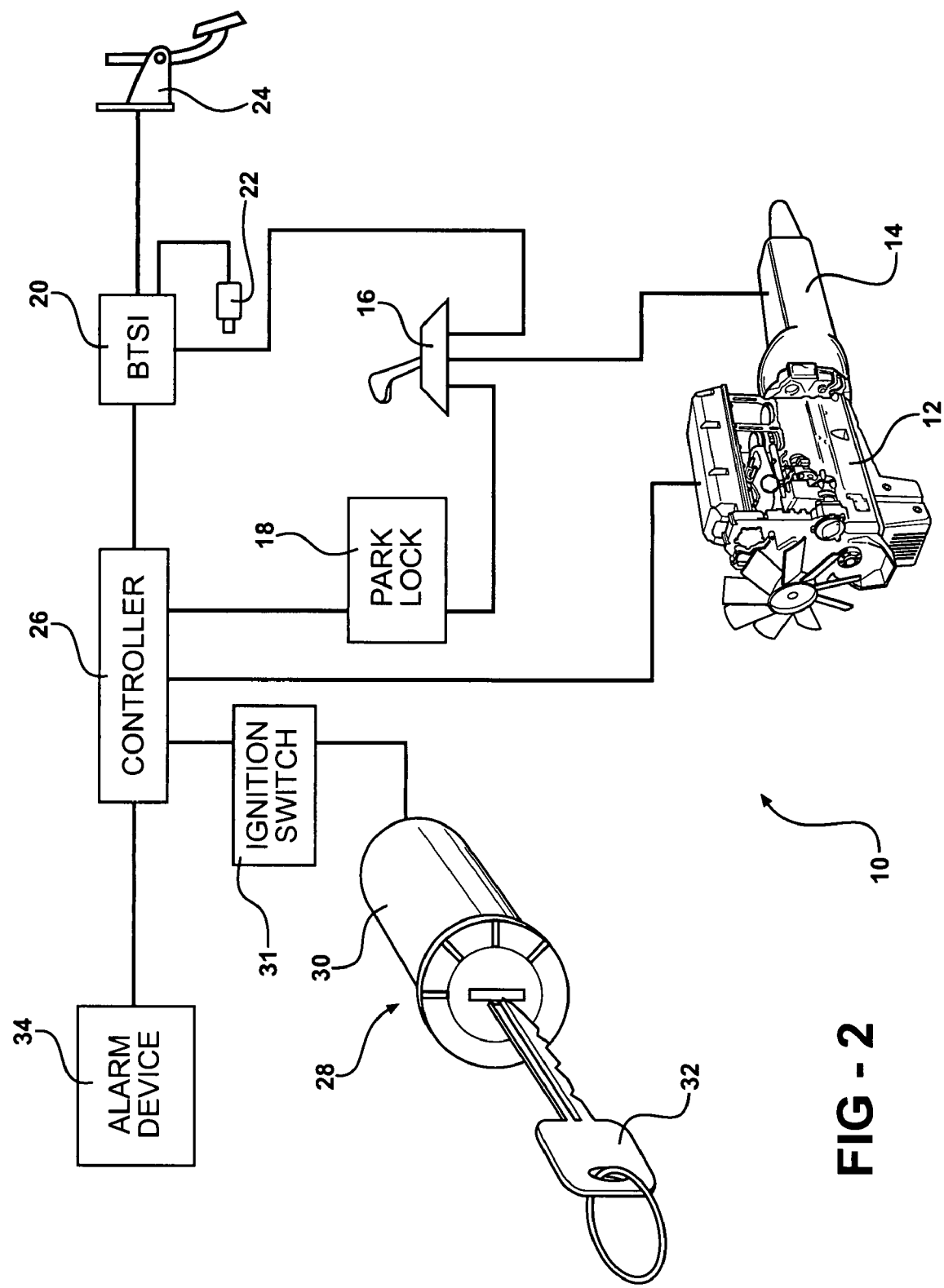
FIG. 2 is a schematic diagram illustrating various mechanical and electrical connections between the key cylinder and various other components along with a vehicle key shown in spaced relationship to the key cylinder.

Referring to the Figures, wherein like numerals indicate like or corresponding parts throughout the several views, a vehicle assembly is generally shown at 10 in FIG. 2 and includes an engine 12 with a transmission 14. The vehicle assembly 10 also includes a transmission shift mechanism 16 for moving the transmission 14 between at least one of a park, reverse, neutral, and drive positions. A park-lock system 18 and a brake transmission shift interlock (BTSI) system 20 are connected to the shift mechanism 16 for restricting the movement of the shift mechanism 16 in certain situations. The park-lock system 18 is utilized when a vehicle key 32, for example, is not in an ignition and the BTSI system 20 is utilized when the key 32 is in the ignition. The BTSI system 20 includes a locking device 22 coupled to the shift mechanism 16. The BTSI system 20 also includes a vehicle brake, such as a pivotal brake pedal 24, mounted to the vehicle. The locking device 22 is movable between and engaged position retaining the shift mechanism 16 in one of the park, reverse, neutral, and drive positions, and a disengaged position permitting movement of the shift mechanism 16 from one of the park, reverse, neutral and drive positions. Preferably, the locking device 22 is of the type that includes a solenoid with a plunger that engages and disengages a terminal end of a cable. The shift mechanism 16, park-lock system 18, and BTSI system 20 are common in the automotive industry and can be of any suitable design or configuration as known to those skilled in the art.

A controller 26 is connected between the BTSI system 20, which includes the locking device 22 and brake pedal 24, and the park-lock system 18. The controller 26 also connects to the engine 12 and other components as will be discussed below.

Figure 1:
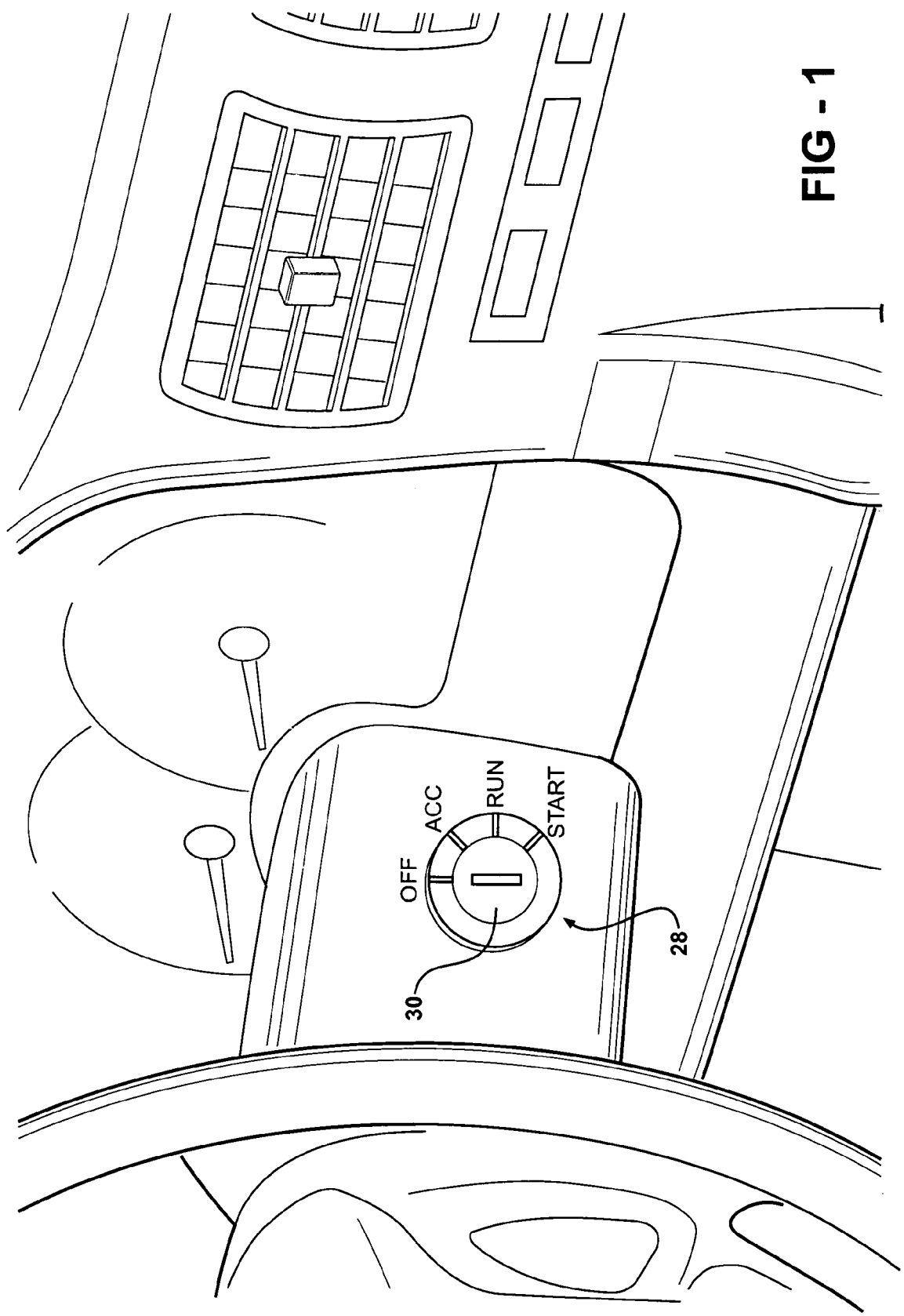
FIG. 1 is a fragmentary perspective view of a steering column and steering wheel with a key cylinder.

An ignition system 28 is coupled to the controller 26 and, as also shown in FIG. 1, the ignition system 28 includes a key cylinder 30 movable between off, accessory, run, and start positions for starting and stopping the engine. As known in the art, the ignition system 28 also includes an ignition switch 31 that provides the proper communication to the controller 26. The ignition switch 31 is interconnected between the key cylinder 30 and the controller 26. The ignition system 28 can also include the vehicle key 32 with the vehicle key 32 being insertable into the key cylinder 30. The relative angular orientations of the key cylinder 30 positions is of no consequence and can be of any suitable configuration. Further, there could be additional positions without deviating from the scope of the subject invention.

An alarm device 34 may also be connected to the controller 26. The alarm device 34 may be of any suitable design and is typically a chime or buzzing circuit that becomes operable when the vehicle key 32 is disposed within the key cylinder 30. Often the alarm device 34 emits an audible alarm and may also include a visual display alarm.

Figure 4:
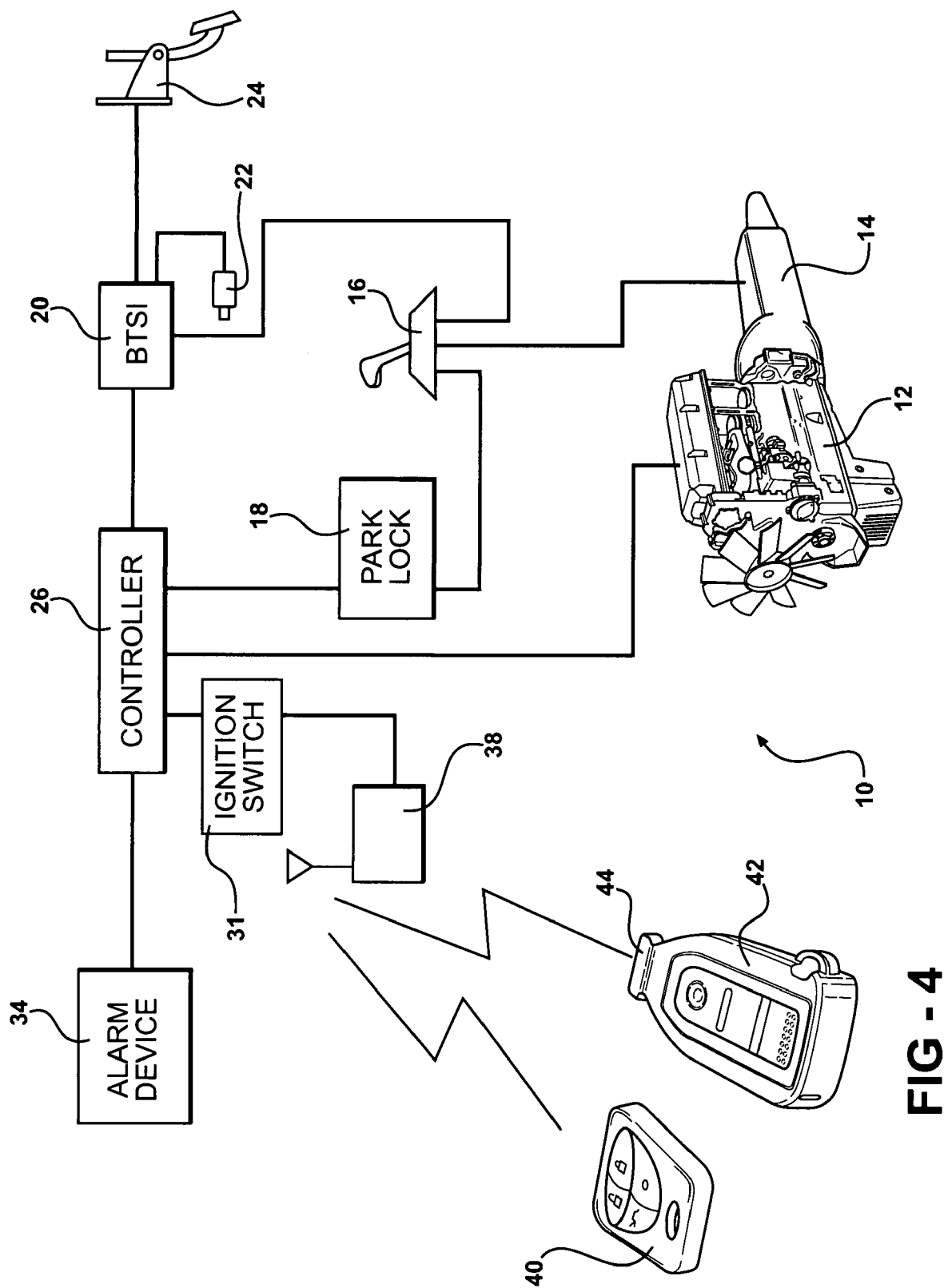
FIG. 4 is a schematic diagram of an alternative embodiment illustrating various mechanical and electrical connections between a wireless receiver and various other components along with a vehicle key and a key fob shown in spaced relationship to the wireless receiver.

Referring to FIG. 4, an alternative embodiment to the subject invention is shown, which incorporates a keyless entry system and/or a keyless ignition system. These keyless systems each include a wireless receiver 38 coupled to the controller 26. The wireless receiver 38 may be used in conjunction with or in substitution for the key cylinder 30. In the keyless entry system, a wireless entry transmitter 40 may be provided separate from or integrated with the key 32, which are commonly known as key fobs. Key fobs often accompany the vehicle key 32. The wireless receiver 38 is activated upon actuation of the wireless entry transmitter 40. Typically, the wireless entry transmitter 40 is utilized to unlock and lock vehicle doors as well as open a rear hatch or trunk. The keyless ignition system 28 includes an alternative vehicle 'key' 42 having a built-in wireless ignition transmitter 44. This type of 'key' 42 does not operate like a traditional key and can eliminate the need for a key cylinder. As known in the art, the wireless receiver 38 is activated when the vehicle 'key' 42, more importantly the ignition transmitter 44, is in relative proximity to the wireless receiver 38. The ignition switch 31 is typically interconnected between the wireless receiver 38 and the controller 26 and communicates with the controller 26 upon activation of the wireless receiver 38. When using a keyless ignition system, a 'push' button ignition (not shown) is typically installed within the vehicle for starting and stopping the engine. The alternative 'key' 42 may also include an integrated wireless entry transmitter for locking and unlocking the doors.

As discussed in greater detail below, the controller 26 energizes the locking device 22 in response to a predefined event to move the locking device 22 into the locked position while the ignition system 28 remains substantially in the off position. Preferably, the controller 26 energizes and de-energizes the solenoid to move the plunger between the engaged and disengaged positions. The predefined event can be any number of events, such as the vehicle key 32 being inserted into the key cylinder 30, the alarm device 34 becoming operable, or the wireless receiver 38 being activated. The predefined events are designed such that the locking device 22 is actuated or functional throughout an entire range of potential safety situations. For example, when a key cylinder 30 is utilized, the locking device 22 is actuated for all key positions associated with the ignition system 28, e.g., off, accessory, on (run), start, or any other designated position associated with any type of ignition system 28.

Figure 3:
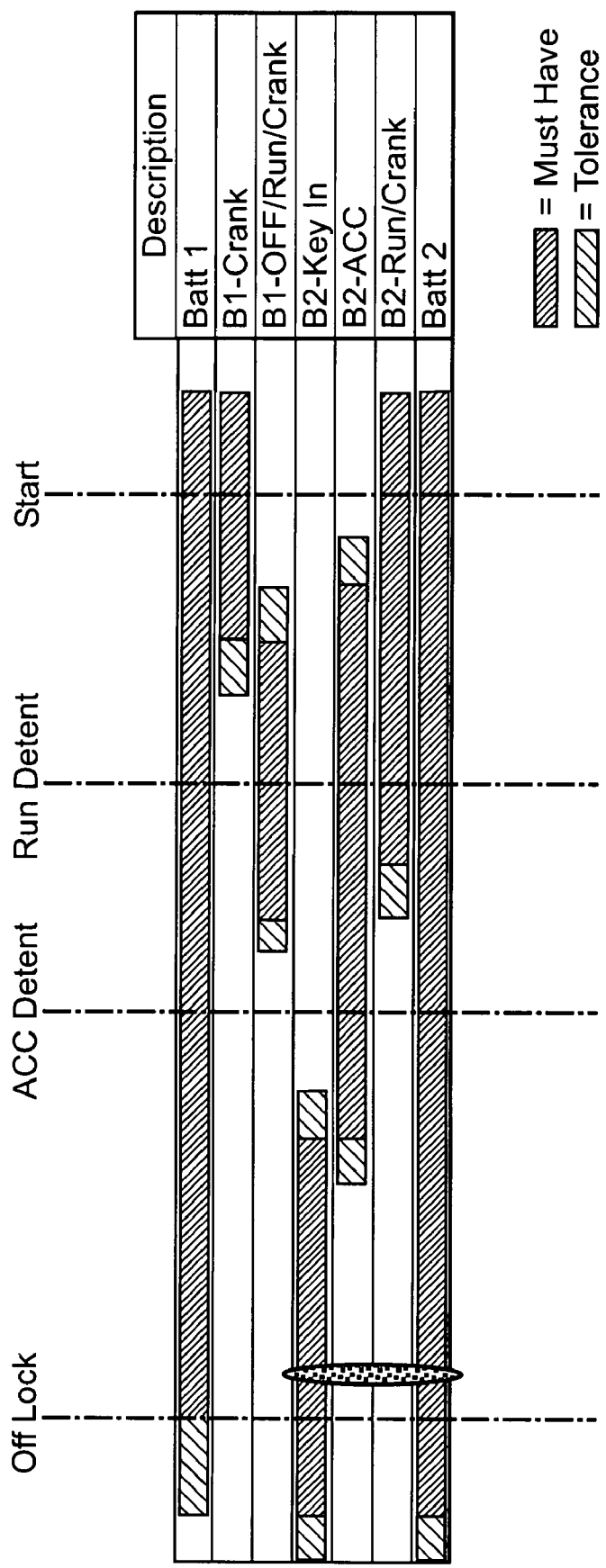
FIG. 3 is a schematic diagram illustrating operational positions of the key cylinder.

Referring to FIG. 3, in the embodiment utilizing the key cylinder 30 in conjunction with the alarm device 34, the present invention initiates the BTSI system 20 during the B2-Key In Buzzer Circuit, thus activating the locking device 22 as soon as the driver of the vehicle inserts the key into the key cylinder 30 to a sufficient degree. The present invention would provide a software modification to the B2-Key In Buzzer Circuit program. Hence, as indicated by the oval, the locking device 22 would be activated almost as soon as the driver places the key into the key cylinder 30, and would be fully activated by the time the key was fully placed or seated in the key cylinder 30, e.g., as shown in proximity to the Off Lock position. Therefore no gaps are present to allow for unauthorized or inadvertent movement of the shift mechanism 16 thereby providing virtually instantaneous protection once the key is inserted into the key cylinder 30.

In accordance with another aspect of the present invention and as discussed above, a keyless entry system may be utilized. By way of a non-limiting example, the same alarm device 34, e.g., B2-Key In Buzzer Circuit, is also used to power a door lock signal. Accordingly, when activating a key fob to unlock the vehicle doors, the BTSI system 20 would also be activated or engaged. Regardless of the system, when the keys 32, 42 are removed from the vehicle, the BTSI system 20 would de-activate as the doors are locked. Again, a software modification may be required. It should be appreciated that the present invention can be practiced with other vehicle systems as well, and is not limited to the B2-Key In Buzzer Circuit, as previously described.

Particular advantages of the present invention include, without limitation: (1) the use of existing mechanical hardware; (2) the use of low current switches that would allow circuit modification using existing vehicle software; (3) no need for mechanical overrides; (4) provides a common solution for a vehicle manufacturer's automatic transmission 14 vehicles regardless of each unique shifter design (e.g., column, floor and/or instrument panel (IP)-mounted shifters); (5) provides a low cost/high volume solution; (6) does not compromise or require additional packaging space; and (7)

provides overlap protection between mechanical park-lock systems 18 and electrical BTSI systems 20 in all key positions.

The method of operating the subject invention is now discussed in further detail. In particular, the subject invention includes a method of preventing unauthorized movement of the transmission shift mechanism 16 of the vehicle. The method comprises the steps of detecting the predefined event; moving the locking device 22 into an engaged position with the shift mechanism 16 upon the occurrence of the predefined event to retain the shift mechanism 16 in at least one of a park, reverse, neutral, and drive position; and maintaining the ignition system 28 in a substantially off position during the detecting of the event and the moving of the locking device 22 into the engaged position. In other words, the locking device 22 is moved to the engaged position prior to the ignition system 28 moving beyond the off position.

In the embodiment utilizing the key cylinder 30 and the vehicle key 32, the step of detecting a predefined event is further defined as inserting the vehicle key 32 into the key cylinder 30. The step of detecting the predefined event can also be further defined as activating the alarm device 34. Preferably, the insertion of the vehicle key 32 and the activating of the alarm device 34 are performed simultaneously.

The vehicle key 32 may be moved within the key cylinder 30 to in turn move the ignition system 28 from the off position to an accessory position. The locking device 22 is maintained in the engaged position during the movement of the ignition system 28 to the accessory position. The vehicle key 32 may also move within the key cylinder 30 to in turn move the ignition system 28 from one of the off position and the accessory position to a run position. Similarly, the locking device 22 is maintained in the engaged position during the movement of the ignition system 28 to the run position. The locking device 22 is moved to the disengaged position upon actuation of the vehicle brake to permit movement of the shift mechanism 16.

In the embodiment utilizing a keyless entry system and/or a keyless ignition system, the step of detecting the predefined event is further defined as activating the wireless receiver 38. The activating of the wireless receiver 38 may be accomplished by actuating the wireless entry transmitter 40. Preferably, the step of actuating the wireless entry transmitter 40 is further defined as unlocking a door of the vehicle. The activating of the wireless receiver 38 may also be accomplished through a relative proximity of the vehicle key 32 to the wireless receiver 38. In the keyless ignition system, the ignition system 28 can be activated to one of the accessory and run positions while maintaining the locking device 22 in the engaged position during this activation of the ignition system 28. The locking device 22 is moved to a disengaged position upon actuation of the brake pedal 24 to permit movement of the shift mechanism 16.

One contemplated application of the method is used with automatic transmissions 14. In this application, the step of moving the locking device 22 into the engaged position to retain the shift mechanism 16 in at least one of a park, reverse, neutral, and drive position is further defined as retaining the shift mechanism 16 in the park position. Preferably, the step of moving the locking device 22 is further defined as energizing the solenoid.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A method of preventing unauthorized movement of a transmission shift mechanism of a vehicle utilizing locking device, an ignition system, and a controller, said method comprising the steps of:
   detecting a predefined event;
   moving the locking device into an engaged position with the shift mechanism upon the occurrence of the predefined event to retain the shift mechanism in at least one of a park, reverse, neutral, and drive position;
   maintaining the ignition system in a substantially off position during the detecting of the event and the moving of the locking device into the engaged position; and
   including a wireless receiver mounted to the vehicle and connected to the controller and a vehicle key having a wireless ignition transmitter, and wherein the step of detecting a predefined event is further defined as activating the wireless receiver through a relative proximity of the vehicle key to the wireless receiver.

2. A method as set forth in claim 1 further including the steps of activating the ignition system to one of an accessory position and a run position and maintaining the locking device in the engaged position during the activation of the ignition system.

3. A method as set forth in claim 2 further including a vehicle brake mounted to the vehicle and further including step of moving the locking device to a disengaged position upon actuation of the vehicle brake to permit movement of the shift mechanism.

4. A method as set forth in claim 1 wherein the step of moving the locking device into the engaged position to retain the shift mechanism in at least one of a park, reverse, neutral, and drive position is further defined as retaining the shift mechanism in the park position.

5. A method of preventing unauthorized movement of a transmission shift mechanism of a vehicle utilizing a locking device, an ignition system, and a controller, said method comprising the steps of:
   detecting a predefined event;
   moving the locking device into an engaged position with the shift mechanism upon the occurrence of the predefined event to retain the shift mechanism in at least one of a park, reverse, neutral, and drive position;
   maintaining the ignition system in a substantially off position during the detecting of the event and the moving of the locking device into the engaged position; and
   including a wireless receiver mounted to the vehicle and connected to the controller and a wireless entry transmitter, and wherein the step of detecting a predefined event is further defined as actuating the wireless entry transmitter.

6. A method as set forth in claim 5 wherein the step of actuating the wireless entry transmitter is further defined as unlocking a door of the vehicle.

7. A method of preventing unauthorized movement of a transmission shift mechanism of a vehicle utilizing a locking device, an ignition system, and a controller, said method comprising the steps of:
   detecting a predefined event;
   moving the locking device into an engaged position with the shift mechanism upon the occurrence of the predefined event to retain the shift mechanism in at least one of a park, reverse, neutral, and drive position; and maintaining the ignition system in a substantially off position during the detecting of the event and the moving of the locking device into the engaged position wherein the locking device includes a solenoid and wherein the step of moving the locking device is further defined as energizing the solenoid.

8. A vehicle assembly having an engine and a transmission, said assembly comprising:
- a transmission shift mechanism for moving the transmission between at least one of a park, reverse, neutral, and drive positions;
- a locking device coupled to said shift mechanism and movable between an engaged position retaining the shift mechanism in at one of said park, reverse, neutral, and drive positions, and a disengaged position permitting movement of the shift mechanism from one of said park, reverse, neutral and drive positions;
- an ignition system movable between off, accessory, run, and start positions for starting and stopping the engine; and
- a controller connected to said locking device and said ignition system with said controller energizing said locking device in response to a predefined event to move said locking device into said locked position while said ignition system remains substantially in said off position wherein said locking device includes a solenoid with said controller energizing said solenoid in response to said predefined event.

9. A vehicle assembly having an engine and a transmission, said assembly comprising:
- a transmission shift mechanism for moving the transmission between at least one of a park, reverse, neutral, and drive positions;
- a locking device coupled to said shift mechanism and movable between an engaged position retaining the shift mechanism in at one of said park, reverse, neutral, and drive positions, and a disengaged position permitting movement of the shift mechanism from one of said park, reverse, neutral and drive positions;
- an ignition system movable between off, accessory, run, and start positions for starting and stopping the engine;
- a controller connected to said locking device and said ignition system with said controller energizing said locking device in response to a predefined event to move said locking device into said locked position while said ignition system remains substantially in said off position; and
- including a wireless receiver connected to said controller and further including a vehicle key having a wireless ignition transmitter with the wireless receiver being activated when the vehicle key is in relative proximity to the wireless receiver to define said predefined event.

10. A vehicle assembly having an engine and a transmission, said assembly comprising:
- a transmission shift mechanism for moving the transmission between at least one of a park, reverse, neutral, and drive positions;
- a locking device coupled to said shift mechanism and movable between an engaged position retaining the shift mechanism in at one of said park, reverse, neutral, and drive positions, and a disengaged position permitting movement of the shift mechanism from one of said park, reverse, neutral and drive positions;
- an ignition system movable between off, accessory, run, and start positions for starting and stopping the engine;
- a controller connected to said locking device and said ignition system with said controller energizing said locking device in response to a predefined event to move said locking device into said locked position while said ignition system remains substantially in said off position; and
- including a wireless receiver connected to said controller and further including a wireless entry transmitter with the wireless receiver being activated upon actuation of the wireless entry transmitter to define said predefined event.

* * * * *